(12) United States Patent
Kim et al.

(10) Patent No.: US 7,362,024 B2
(45) Date of Patent: Apr. 22, 2008

(54) ROTOR OF BLDC MOTOR

(75) Inventors: Young-Kwan Kim, Gyeonggi-Do (KR); Deok-Jin Kim, Seoul (KR); Sung-Ho Lee, Seoul (KR); Jin-Soo Park, Incheon (KR)

(73) Assignee: LG Electronics Inc, Seoul (KR)

( * ) Notice: Subject to any disclaimer, the term of this patent is extended or adjusted under 35 U.S.C. 154(b) by 0 days.

(21) Appl. No.: 11/024,762

(22) Filed: Dec. 30, 2004

(65) Prior Publication Data
US 2006/0055263 A1 Mar. 16, 2006

(30) Foreign Application Priority Data
Sep. 13, 2004 (KR) .................... 10-2004-0073080

(51) Int. Cl.
*H02K 21/12* (2006.01)
(52) U.S. Cl. ............................ 310/156.21; 310/156.59
(58) Field of Classification Search ........ 310/216–218, 310/156, 156.12–156.15, 156.21, 156.23, 310/156.26, 156.28–156.31, 156.48–156.61, 310/268, 269
See application file for complete search history.

(56) References Cited

U.S. PATENT DOCUMENTS

| | | | | |
|---|---|---|---|---|
| 2,060,259 A | * | 11/1936 | Spengler | 310/156.61 |
| 2,604,499 A | * | 7/1952 | Buckley | 310/156.55 |
| 3,072,813 A | * | 1/1963 | Reijnst et al. | 310/156.55 |
| 3,163,788 A | * | 12/1964 | Powers | 310/45 |
| 3,908,158 A | | 9/1975 | Studtmann | |
| 3,979,821 A | * | 9/1976 | Noodleman | 29/598 |
| 4,543,506 A | * | 9/1985 | Kawada et al. | 310/156.59 |
| 4,763,240 A | | 8/1988 | Voss | |
| 4,954,736 A | * | 9/1990 | Kawamoto et al. | 310/156.21 |
| RE33,655 E | * | 8/1991 | Hershberger | 68/23.7 |
| 5,140,211 A | * | 8/1992 | Ucida | 310/156.61 |
| 5,162,686 A | * | 11/1992 | Royer | 310/156.59 |
| 5,266,855 A | * | 11/1993 | Smith et al. | 310/90 |
| 5,650,697 A | | 7/1997 | Imagi et al. | |
| 5,834,874 A | * | 11/1998 | Krueger et al. | 310/191 |
| 5,894,746 A | | 4/1999 | Skrippek | |
| 6,208,113 B1 | | 3/2001 | Lelkes et al. | |
| 6,288,467 B1 | | 9/2001 | Lange et al. | |
| 6,713,986 B1 | | 3/2004 | Jayadev et al. | |

(Continued)

FOREIGN PATENT DOCUMENTS

DE 2206224 8/1973

(Continued)

OTHER PUBLICATIONS

English Language Abstract of JP 2003-0054051, Feb. 7, 2003.

(Continued)

*Primary Examiner*—Dang Le
(74) *Attorney, Agent, or Firm*—Greenblum & Bernstein, P.L.C.

(57) ABSTRACT

Disclosed is a rotor of a BLDC motor including a frame rotatably disposed on an inner circumference of a stator, rotor teeth connected to the outer circumference of the frame in the radial direction at regular intervals, and magnets fixed between the rotor teeth, and arranged in the radial direction so that the facing sides can have the same polarity. The rotor of the BLDC motor improves a torque of the motor by minimizing flux leakage of the magnets.

11 Claims, 7 Drawing Sheets

U.S. PATENT DOCUMENTS

| | | |
|---|---|---|
| 2001/0011879 A1 | 8/2001 | Erdman |
| 2003/0146722 A1 | 8/2003 | Griepentrog et al. |
| 2005/0093391 A1 * | 5/2005 | McMullen et al. .... 310/156.55 |

FOREIGN PATENT DOCUMENTS

| | | | |
|---|---|---|---|
| DE | 19536148 | | 4/1997 |
| EP | 0250008 | | 12/1987 |
| GB | 2289991 | | 12/1995 |
| JP | 61293142 | | 12/1986 |
| JP | 1144337 | | 6/1989 |
| JP | 406038415 A | * | 7/1992 |
| JP | 847190 | | 2/1996 |
| JP | 2002218684 | | 8/2002 |
| KR | 2003-0054051 | | 7/2003 |
| RU | 2076437 | | 3/1997 |

OTHER PUBLICATIONS

English language abstract of Russian 2076437, Mar. 27, 1997.
English language Abstract of JP 2002-21864, Aug. 2002.
English language Abstract of JP 1-144337, Jun. 1989.
English language Abstract of JP 61-293142, Dec. 1986.
English language Abstract of JP 8-47190, Feb. 1996.
English language Abstract of DE 19536148, April 1997.
English language Abstract of EP 0250008, Dec. 1987.

* cited by examiner

ROTOR OF BLDC MOTOR

BACKGROUND OF THE INVENTION

1. Field of the Invention

The present invention relates to a rotor of a BLDC motor, and more particularly to, a rotor of a BLDC motor which can improve a torque of the motor by minimizing flux leakage of magnets.

2. Description of the Background Art

In general, BLDC motors are classified into surface mounted magnet type motors and interior permanent magnet type motors according to structure of a magnetic circuit.

A torque of the surface mounted magnet type motor is a magnet torque generated by interactions between a flux generated in magnets and a winding current of a stator. A torque of the interior permanent magnet type motor is a sum of a torque generated by overlapping of a reluctance torque generated by different magnetic resistances by relative positions of a magnetic pole by a current of a stator and a magnetic pole by magnets of a rotor, and the torque of the surface mounted magnet type motor.

FIG. 1 is a perspective view illustrating a disassembled state of a conventional BLDC motor, and FIG. 2 is a plane view illustrating the conventional BLDC motor.

The conventional BLDC motor includes a stator 102 fixed to a casing of a washing machine for receiving power, and a rotor 104 disposed on the outer circumference of the stator 102 with a predetermined air gap, connected to a laundry sink of the washing machine, and rotated by interactions with the stator 102 when power is applied to the stator 102.

Here, the stator 102 has a stator core 106 formed by stacking a plurality of circular sheets, teeth 108 mounted on the outer circumference of the stator core 106 in the radial direction at predetermined intervals, and coils 110 coiled around each of the teeth 108 for receiving power.

The rotor 104 includes a rotor frame 120 having a housing space of the stator 102 and having back yokes that are flux paths on its outer circumference, and a plurality of magnets 122 disposed on the inner circumference of the rotor frame 120.

The magnets 122 are formed in a circular arc shape, magnetized in the radial direction, and arranged on the inner circumference of the rotor frame 120 in the circumferential direction.

The operation of the conventional BLDC motor will now be explained.

When power is applied to the coils 110, a torque is generated by interactions between a flux formed by the magnets 122 of the rotor 104 and a flux formed by the coils 110 of the stator 102, for rotating the magnets 122. Therefore, the rotor frame 120 to which the magnets 122 are fixed is also rotated.

As shown in FIG. 3, the conventional BLDC motor shows flux distributions by relative positions of the rotor 104. There are no magnetic resistance differences by relative positions of a magnetic pole by the current applied to the coils 110 of the stator 102 and a magnetic pole by the magnetic force of the magnets 122.

In the conventional BLDC motor, to increase a counter electromotive force, a stack length of the rotor 104 is set to be longer than a stack length of the stator 102, which is generally called an overhang. The overhang improves the counter electromotive force by increasing the flux of the magnets 122 interlinked with the coils 110 of the stator 102 by a predetermined amount. In this case, the counter electromotive force increases by the overhang of the rotor 104.

However, the counter electromotive force does not increase but maintains the same level over a predetermined overhang. Accordingly, it is limitative to increase the torque of the motor.

FIG. 4 is a graph showing a flux density by an overhang length in the conventional BLDC motor.

As depicted in FIG. 4, in the conventional BLDC motor, when the overhang of the rotor 104 increases, the flux density of the magnets 122 gradually increases. When the overhang of the rotor 104 reaches about 6 mm, the flux density of the magnets 122 does not increase but maintains the same level.

SUMMARY OF THE INVENTION

Therefore, an object of the present invention is to provide a rotor of a BLDC motor which can improve a torque of the motor by minimizing flux leakage of magnets magnetized in the circumferential direction by disposing same polarity of magnets to face each other.

To achieve these and other advantages and in accordance with the purpose of the present invention, as embodied and broadly described herein, there is provided a rotor of a BLDC motor, including: a frame rotatably disposed on an inner circumference of a stator; rotor teeth connected to the outer circumference of the frame in the radial direction at regular intervals; and magnets fixed between the rotor teeth, and arranged in the radial direction so that the facing sides can have the same polarity.

Preferably, the frame is formed in a disk shape and made of a nonmagnetic substance, a fixing hole for fixing a rotary shaft being formed at the center of the frame.

Preferably, the rotor teeth are separated from each other and connected to the outer circumference of the frame at regular intervals.

Each of the rotor teeth is formed in a trapezoidal shape having their width increased from the inside to outside, for contacting both sides of the magnets.

First and second stopping protrusions for preventing separation of the magnets are formed at the inner and outer portions of the rotor teeth.

The frame, the rotor teeth and the magnets are assembled and molded.

The magnets are magnetized in the circumferential direction and fixed between the rotor teeth, so that the facing sides can have the same polarity.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

A rotor of a BLDC motor in accordance with the most preferable embodiment of the present invention will now be described in detail with reference to the accompanying drawings.

Figure 1:
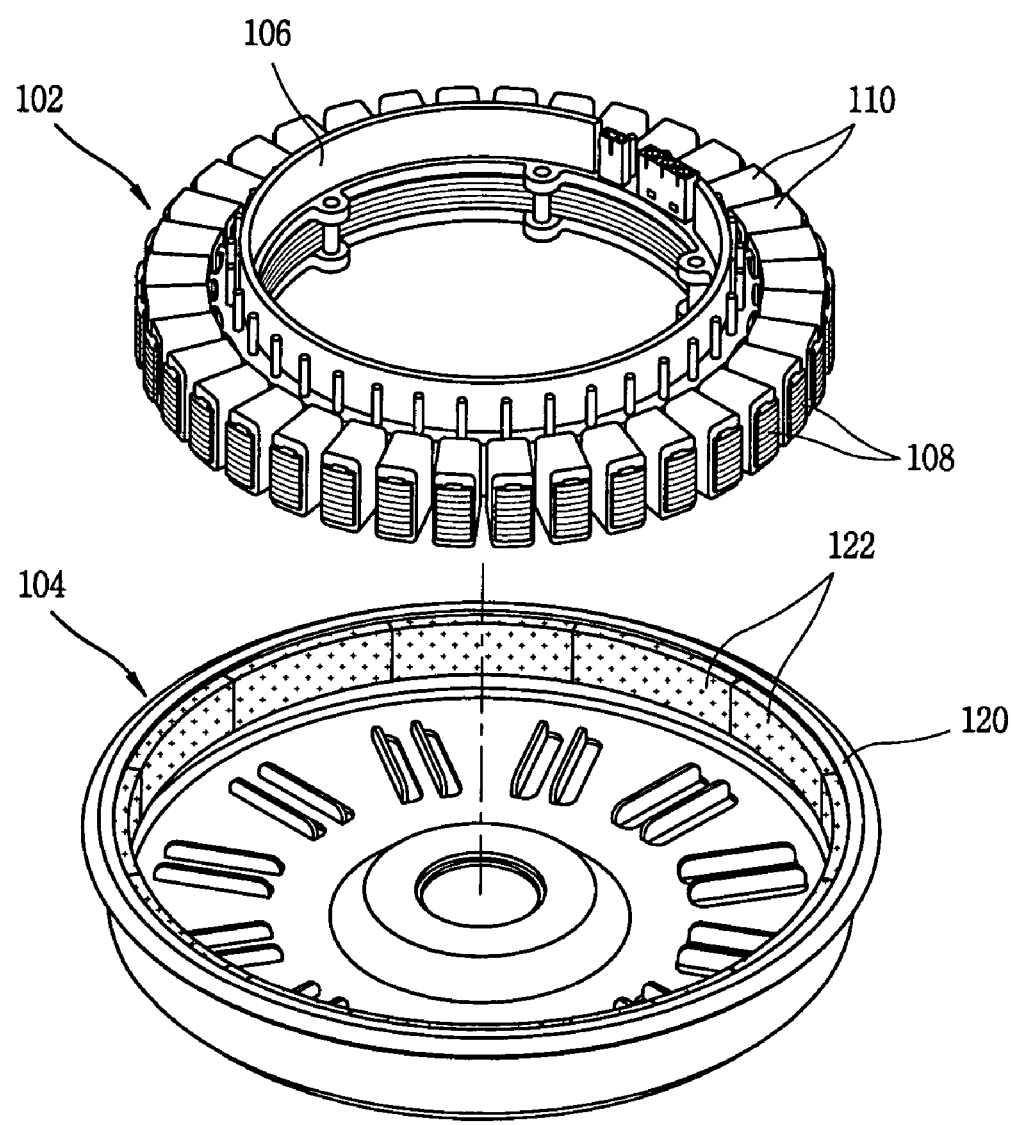
FIG. 1 is a perspective view illustrating a disassembled state of a conventional BLDC motor.
Figure 2:
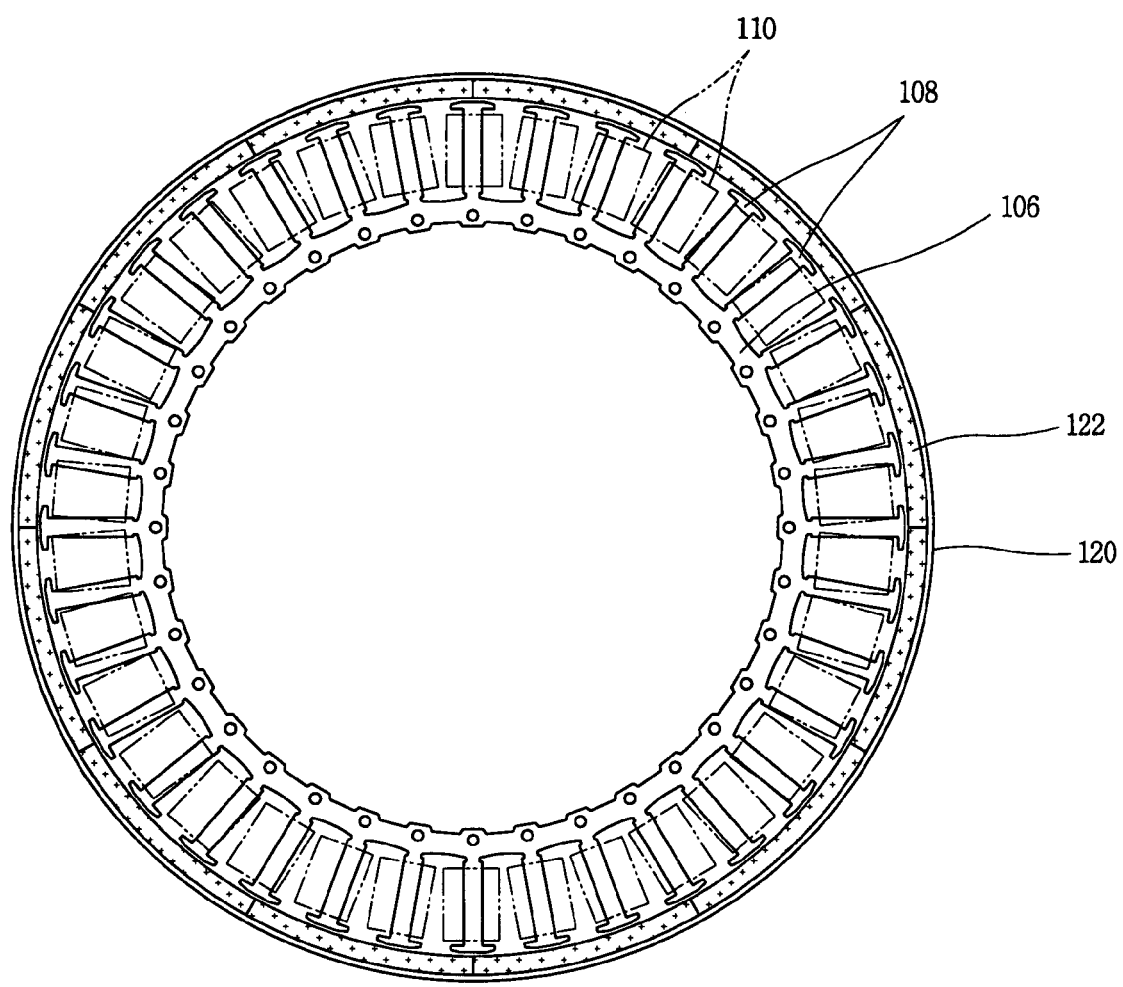
FIG. 2 is a plane view illustrating the conventional BLDC motor.
Figure 3:
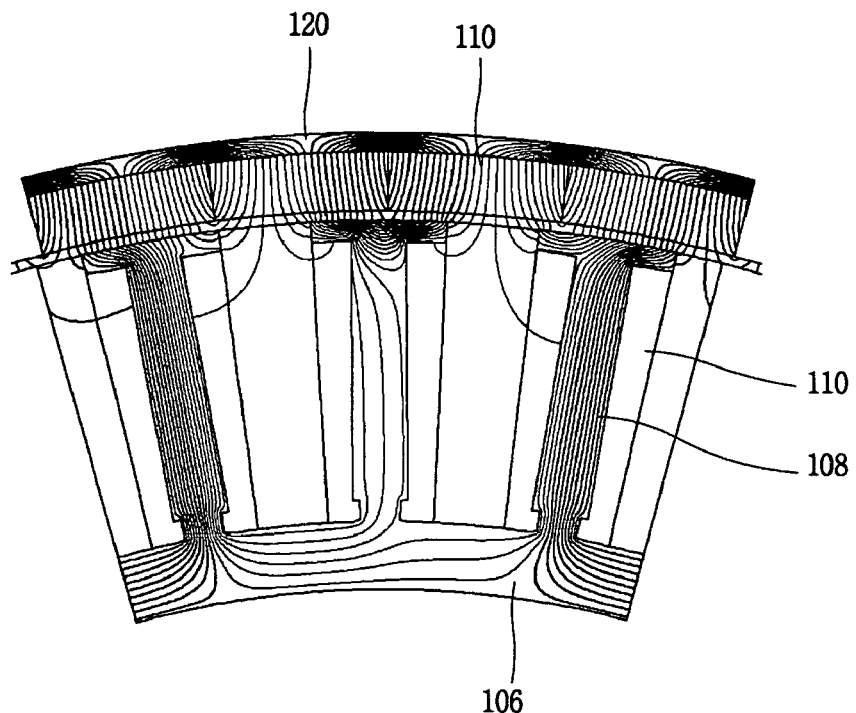
FIG. 3 is a flux distribution view illustrating the conventional BLDC motor.
Figure 4:
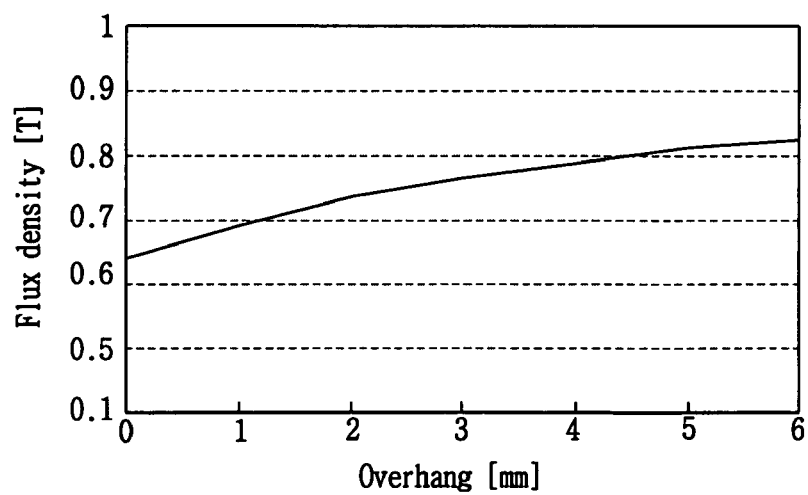
FIG. 4 is a graph showing a flux density by an overhang length in the conventional BLDC motor.
Figure 5:
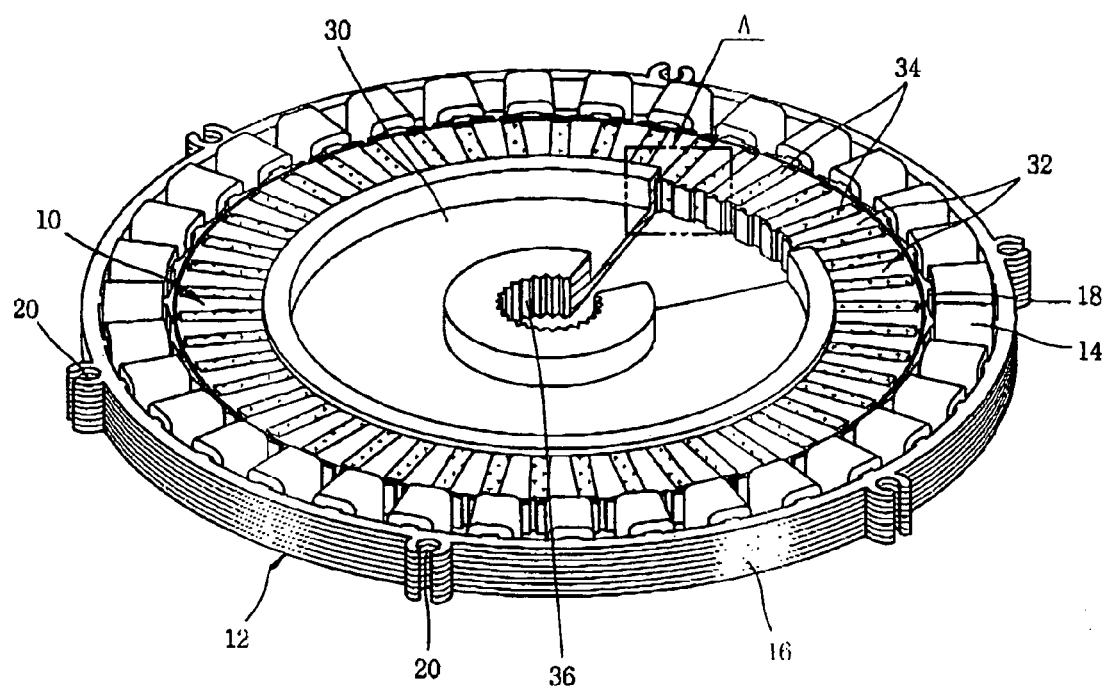
FIG. 5 is a perspective view illustrating a BLDC motor in accordance with the present invention.
Figure 6:
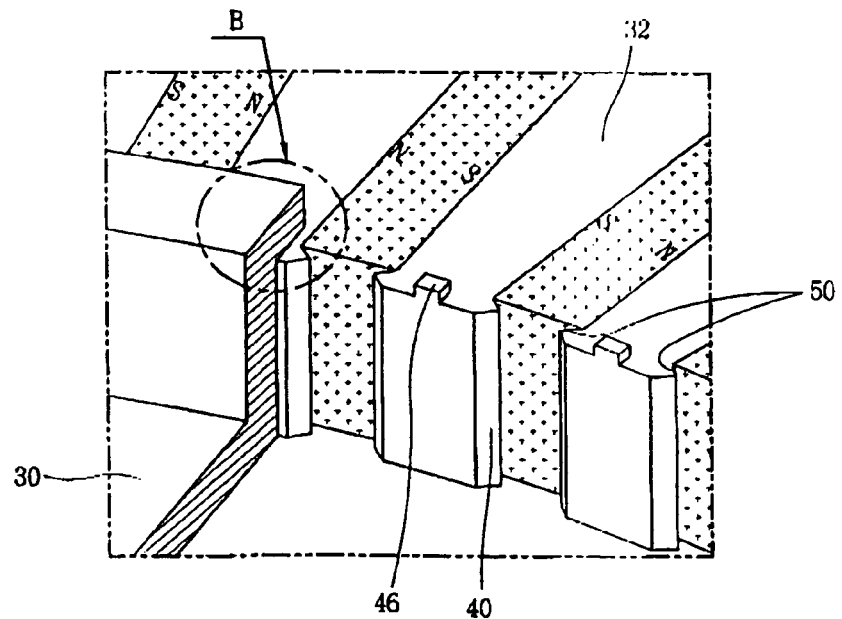
FIG. 6 is an enlarged view illustrating part A of FIG. 5.
Figure 7:
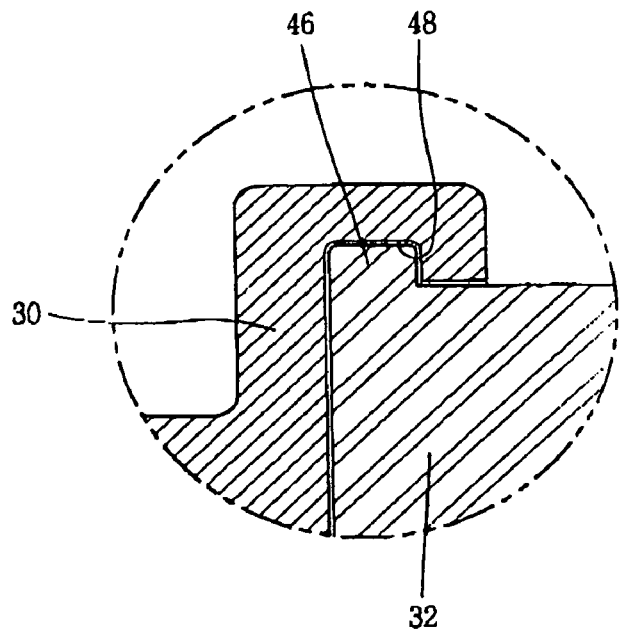
FIG. 7 is an enlarged view illustrating part B of FIG. 6.

FIG. 5 is a perspective view illustrating the BLDC motor in accordance with the present invention, FIG. 6 is an enlarged view illustrating part A of FIG. 5, and FIG. 7 is an enlarged view illustrating part B of FIG. 6.

The BLDC motor includes a stator 12 formed in a ring shape, coils 14 receiving power being coiled around the stator 12, and a rotor 10 disposed on the inner circumference of the stator 12 with a predetermined air gap, and rotated by interactions with the stator 12 when power is applied to the coils 14.

Figure 11:
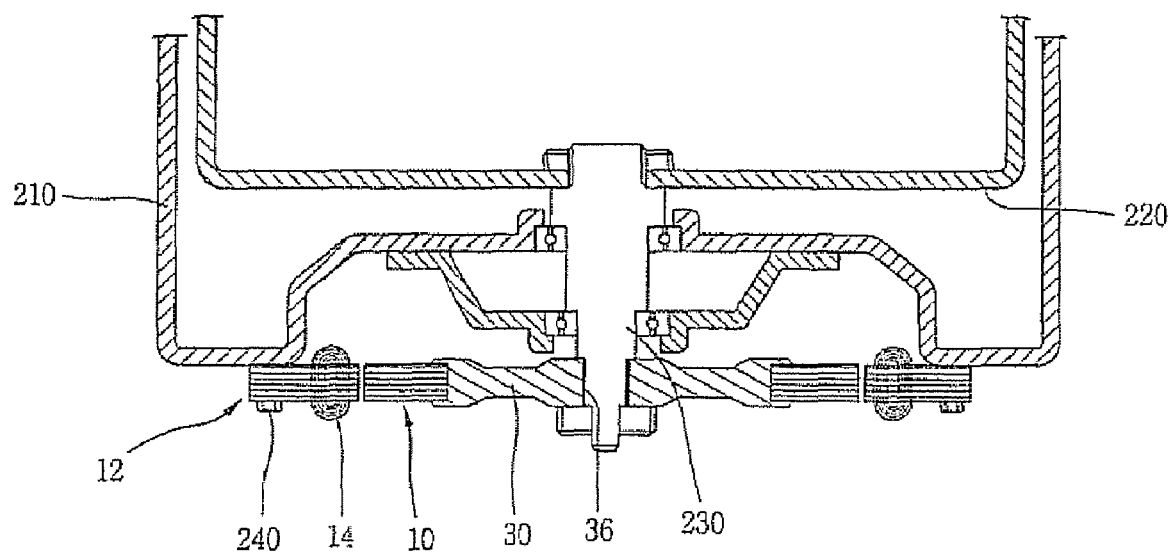
FIG. 11 illustrates a washing machine which incorporates a BLDC motor in accordance with the present invention.

When the BLDC motor is applied to a washing machine, as shown in FIG. 11, the stator 12 is fixed to a fixed body such as a casing 210 of the washing machine, and the rotor 10 is connected to a laundry sink 220 of the washing machine for rotating the laundry sink 220.

The stator 12 has a stator core 16 formed by stacking a plurality of circular sheets, stator teeth 18 mounted on the inner circumference of the stator core 16 in the radial direction at predetermined intervals, and coils 14 coiled around each of the stator teeth 18 and connected to each other, for receiving power.

In order to fix the stator 12 to a fixed body, fixing holes 20 through which bolts 240 pass are formed on the outer circumference of the stator core 16 at regular intervals.

Figure 8:
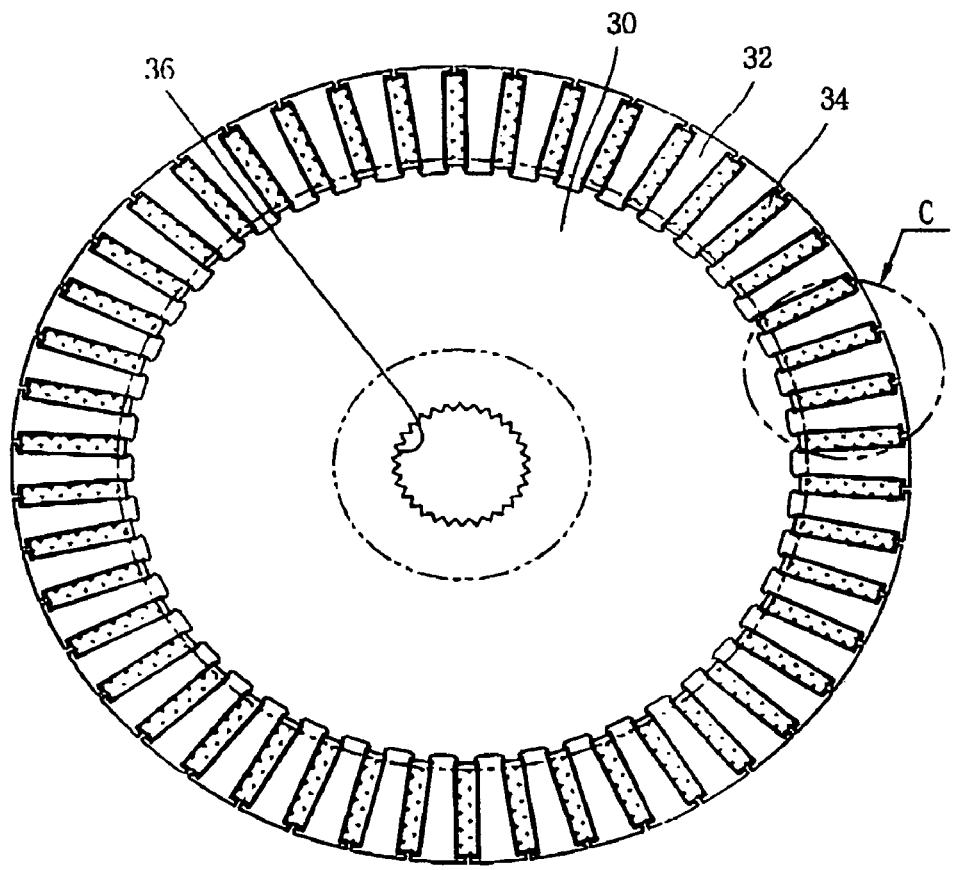
FIG. 8 is a plane view illustrating a rotor of the BLDC motor in accordance with the present invention.
Figure 9:
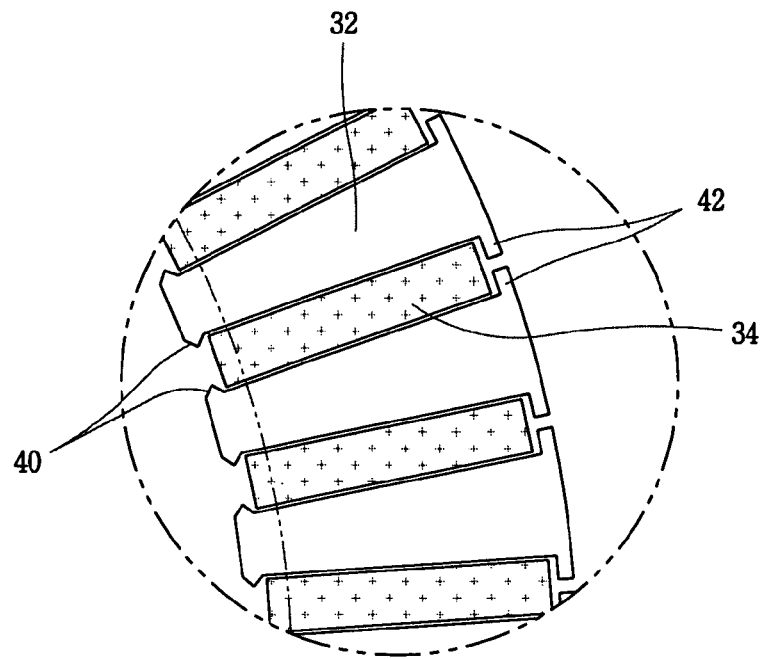
FIG. 9 is an enlarged view illustrating part C of FIG. 8.

FIG. 8 is a plane view illustrating the rotor of the BLDC motor in accordance with the present invention, and FIG. 9 is an enlarged view illustrating part C of FIG. 8.

The rotor 10 includes a frame 30 being rotatably disposed on the inner circumference of the stator 12, and having a rotary shaft 230 mounted at its center, rotor teeth 32 connected to the outer circumference of the frame 30 in the radial direction at regular intervals, and a plurality of magnets 34 disposed between the rotor teeth 32.

The frame 30 is formed in a disk shape. A fixing hole 36 for fixing the rotary shaft is formed at the center of the frame 30. The rotor teeth 32 are fixed to the outer circumference of the frame 30 at regular intervals. Preferably, the frame 30 is made of a nonmagnetic substance.

The rotor teeth 32 are disposed on the outer circumference of the frame 30 in the radial direction at regular intervals. The magnets 34 are fixed between the rotor teeth 32, respectively. Here, each of the rotor teeth 32 is formed in a trapezoidal shape having their width increased from the inside to outside, for contacting both sides of the magnets 34.

First and second stopping protrusions 40 and 42 for preventing separation of the magnets 34 are formed at the inner and outer portions of the rotor teeth 32. Here, the first stopping protrusions 40 are extended in the width direction from the inside ends of the rotor teeth 32, so that the inside surfaces of the magnets 34 can be hooked thereon, and the second stopping protrusions 42 are extended in the width direction from the outside ends of the rotor teeth 32, so that the outside surfaces of the magnets 34 can be hooked thereon.

Preferably, the rotor teeth 32 are manufactured by sheet metal working silicon steel or sintering magnetic powder.

The rotor teeth 32 can be incorporated by connecting the inside surfaces. In this case, the flux is leaked by bridges connecting the rotor teeth 32, thereby reducing the torque. Preferably, the rotor teeth 32 are manufactured as single products without using bridges, and fixed to the frame 30 in the radial direction.

Fastening units 46 and 48 for fastening the rotor teeth 32 to the outer circumference of the frame 30 are formed between the rotor teeth 32 and the frame 30. That is, the fastening units 46 and 48 are hooking protrusions 46 protruded from the upper ends of the inside end portions of the rotor teeth 32, and hooked grooves 48 formed on the outer circumference of the frame 30. The hooking protrusions 46 are inserted into the hooked grooves 48.

The magnets 34 are mounted between the rotor teeth 32, arranged on the outer circumference of the frame 30 in the radial direction, and formed in a rectangular shape having a longer radial direction length than a circumferential direction width. The magnets 34 are magnetized in the circumferential direction and arranged so that the facing sides can have the same polarity.

Hooking jaws 50 hooked on the top surfaces of the rotor teeth 32 for preventing the magnets 34 from being separated in the down direction are formed at the upper ends of both sides of the magnets 34.

After the rotor teeth 32 are mounted on the outer circumference of the frame 30 in the radial direction and the magnets 34 are fixed between the rotor teeth 32, the elements of the rotor 10 are firmly fastened by plastic injection molding. Here, bridges between the rotor teeth 32 are made of nonmagnetic substances, to minimize flux leakage.

The process for manufacturing the BLDC motor in accordance with the present invention will now be described.

First, the rotor teeth 32 are manufactured as single products by sheet metal working silicon steel or sintering magnetic powder. The rotor teeth 32 are arranged in a mold in the radial direction, and the magnets 34 are disposed between the rotor teeth 32. Sine the rotor teeth 32 are formed in a trapezoidal shape, the magnets 34 are disposed between the rotor teeth 32 to contact the rotor teeth 32. The first and second stopping protrusions 40 and 42 formed at both ends of the rotor teeth 32 support the magnets 34 not to be separated.

The rotor teeth 32 and the frame 30 are coupled to each other by inserting the hooking protrusions 46 formed on the inner circumferences of the rotor teeth 32 into the hooked grooves 48 formed on the outer circumference of the frame 30.

The rotor teeth 32, the magnets 34 and the frame 30 are incorporated by molding injecting a nonmagnetic substance such as plastic into the mold.

The operation of the BLDC motor in accordance with the present invention will now be explained.

When power is applied to the coils 14, a torque is generated by interactions between a flux formed by the magnets 34 of the rotor 10 and a flux formed by the coils 14 of the stator 12, for rotating the magnets 34. The frame 30 to which the magnets 34 are fixed is rotated, and thus the rotary shaft fixed to the frame 30 is rotated.

Figure 10:
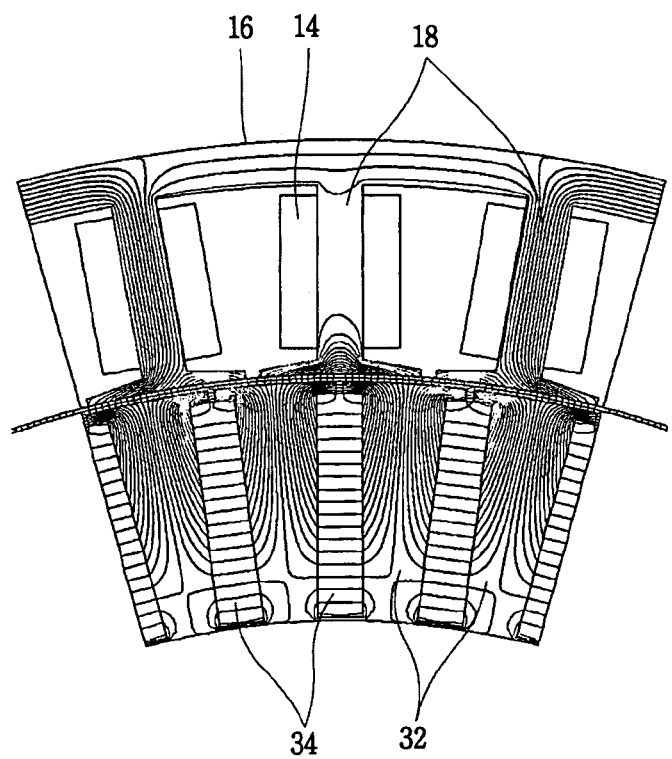
FIG. 10 is a flux distribution view illustrating the BLDC motor in accordance with the present invention.

Different magnetic resistances are generated by relative positions of a magnetic pole by the current applied to the coils 14 of the stator 12 and a magnetic pole by the magnetic force of the magnets 34, thereby generating a magnetic resistance torque. As shown in FIG. 10, the BLDC motor shows flux distributions in the circumferential direction having a high flux density.

As discussed earlier, as compared with the general motor having the same lamination and volume, the BLDC motor considerably improves the torque by increasing the flux density, which results in high motor performance.

In addition, the coil wound amount of the BLDC motor is reduced, to cut down the production expenses. In regard to the same torque, the BLDC motor can be reduced in size.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A rotor of a BLDC motor, comprising:
   a frame rotatably disposed on an inner circumference of a stator, the frame having a disc shape with a curved edge, and a fixing hole configured to fix a rotary shaft, connected to a washing tub of a washing machine, to the center of the frame, the frame comprising a material which is nonmagnetic;
   rotor teeth connected to an outer circumference of the frame in a radial direction at regular intervals; and
   magnets fixed between the rotor teeth, and arranged in the radial direction such that for each magnet, the polarity of each side of the magnet facing an adjacent magnet is the same as the polarity of a side of the adjacent magnet facing the magnet,
   wherein first and second stopping protrusions to prevent separation of the magnets are provided at inner and outer portions of the rotor teeth, and
   the rotor teeth and the magnets extend from the outer circumference of the frame in a radial direction of the frame.

2. The rotor of claim 1, wherein the rotor teeth are separated from each other and connected to the outer circumference of the frame at regular intervals.

3. The rotor of claim 2, wherein each of the rotor teeth is configured in a trapezoidal shape, a width of each of the rotor teeth at an end contacting the frame being narrower than a width at an opposite end, and each magnet contacting two rotor teeth.

4. The rotor of claim 2, wherein the rotor teeth are manufactured by sheet metal working silicon steel.

5. The rotor of claim 2, wherein the rotor teeth are manufactured by sintering magnetic powder.

6. The rotor of claim 1, wherein the first stopping protrusions are provided at inside ends of the rotor teeth in a width direction, for supporting inside surfaces of the magnets, and the second stopping protrusions are provided at outside ends of the rotor teeth in the width direction, for supporting outside surfaces of the magnets.

7. The rotor of claim 1, wherein hooking protrusions are formed on inside top surfaces of the rotor teeth, and hooked grooves into which the hooking protrusions are inserted are formed on an outside surface of the frame in a circumferential direction.

8. The rotor of claim 1, wherein the frame, the rotor teeth and the magnets are assembled and molded.

9. A rotor of a BLDC motor, comprising:
   a frame rotatably disposed on an inner circumference of a stator, the frame having a disc shape with a curved edge, and a fixing hole configured to fix a rotary shaft, connected to a washing tub of a washing machine, to the center of the frame, the frame comprising a material which is nonmagnetic;
   rotor teeth connected to an outer circumference of the frame in a radial direction at regular intervals; and
   magnets fixed between the rotor teeth, and arranged in the radial direction such that for each magnet, the polarity of each side of the magnet facing an adjacent magnet is the same as the polarity of a side of the adjacent magnet facing the magnet,
   wherein a hooking protrusion is provided on an inner upper surface of each of the rotor teeth, and hooked grooves are provided along the curved edge of the frame to hook on to the hooking protrusions, and
   the rotor teeth and the magnets extend from the outer circumference of the frame in a radial direction of the frame.

10. The rotor of claim 9, wherein the curved edge of the frame partially covers an inner side of the rotor teeth and the magnets.

11. A BLDC motor, comprising:
    a stator, fixed to a case of a washing machine, and to which power is applied; and
    a rotor rotatably provided inside the stator, coupled to a rotary shaft connected to a washing tub of the washing machine, and rotated by a reluctance torque and a magnet torque, the rotor comprising:
    a frame rotatably disposed on an inner circumference of the stator, the frame having a disc shape with a curved edge, and a fixing hole configured to fix a rotary shaft, connected to a washing tub of a washing machine, to the center of the frame, the frame comprising a material which is nonmagnetic;
    rotor teeth connected to an outer circumference of the frame in a radial direction at regular intervals; and
    magnets fixed between the rotor teeth, and arranged in the radial direction such that for each magnet, the polarity of each side of the magnet facing an adjacent magnet is the same as the polarity of a side of the adjacent magnet facing the magnet,
    wherein inner end side surfaces of the rotor teeth are provided with triangular protrusions to support the magnets and accelerate a flux flow, and
    the rotor teeth and the magnets extend from the outer circumference of the frame in a radial direction of the frame.

* * * * *